Aug. 11, 1925.

A. H. CANDEE

HOB

Filed April 17, 1922

1,548,931

INVENTOR.
ALLAN H. CANDEE
BY
Ralph W. Brown.
ATTORNEY.

Patented Aug. 11, 1925.

1,548,931

UNITED STATES PATENT OFFICE.

ALLAN H. CANDEE, OF MILWAUKEE, WISCONSIN, ASSIGNOR TO THE FALK CORPORATION, OF MILWAUKEE, WISCONSIN, A CORPORATION OF WISCONSIN.

HOB.

Application filed April 17, 1922. Serial No. 554,067.

*To all whom it may concern:*

Be it known that I, ALLAN H. CANDEE, a citizen of the United States, residing at Milwaukee, in the county of Milwaukee and State of Wisconsin, have invented a certain new and useful Improvement in Hobs, of which the following is a full, clear, concise, and exact description, reference being had to the accompanying drawings, forming a part of this specification.

This invention relates to hobs, and particularly to hobs for cutting involute gears of the spur, spiral and worm types.

Hobs ordinarily comprise a number of cutting teeth projecting from a cylindrical base and arranged in one or more helical series extending thereabout. The teeth are usually formed as integral parts of the cylinder, although in some instances they are removably secured thereto. Integral hobs are ordinarily produced by providing a cylinder having one or more integral threads on the surface thereof and by interrupting the thread or threads at regular intervals by transverse gashes or flutes to form one or more helical series of separate projections constituting the bodies of the respective teeth. The face at the leading end of each projection thus formed contains the cutting edges of each tooth and will hereinafter be referred to as the cutting face.

The sides and top of each projection are tapered off rearwardly from the cutting face to secure proper cutting clearance. This is ordinarily accomplished in a relieving lathe or grinder in which the tool or grinding element is advanced parallel to the axis of the hob blank, during the rotation of the blank, so as to follow the lead of the hob thread, the actual relief being effected by an intermittent shifting of the tool or grinding element during such advance.

The finished hob is sharpened and resharpened from time to time by grinding the cutting faces of the respective teeth. Since the original cutting faces are thus destroyed and the fresh cutting edges occur at new positions along the relieved sides of the teeth, it is obvious that the shape of the relieved sides determines the characteristics of the fresh cutting edges.

Throughout the following description, the term "thread" will be employed to designate that imaginary helical thread defined by the cutting faces of the successive teeth and whose sides constitute imaginary helicoidal surfaces containing the side cutting edges of the successive teeth. The term "lead" will be used to designate the length along the hob axis of a thread or helix for one revolution. The term "pressure angle" will also be employed in its usual sense with reference to gear teeth and worm threads, the term "effective pressure angle" being employed to designate the theoretical pressure angle of the imaginary helicoidal surface constituting a side of the hob thread.

Hobs are either single or multiple threaded, the number, shape and lead of the threads being dependent upon the form of tooth which the hob is designed to generate. The gashes or flutes extend substantially normal to the threads, so that in those hobs in which the lead of the threads is long, the gashes extend spirally, although in some instances in which the lead is very short the gashes often extend parallel to the hob axis. Hob threads are known to be either straight or curved sided, dependent upon whether the intersection of an axial plane, or a plane normal to a thread, with the side of the thread, is a straight or a curved line.

The hob was originally considered to be a rack wrapped about a cylinder and, as such, it was believed that, to generate involute gears, a hob thread should be straight sided. It is now generally recognized that straight sided hob threads will not generate theoretically correct involute gears, various attempts having been made to produce hobs having threads of correct form. Although these attempts have not been entirely successful, some have been based upon the more recent correct conception that a hob is essentially a helical gear and that, to generate involute gears, the hob thread must be of involute form.

The attempts heretofore made upon this recent conception as a working basis have involute surfaces upon the actual sides of the hob teeth, without regard to the resulting shape of the effective sides of the thread defined by the cutting edges of successive teeth. Actually, little attention has been paid to the fact that the relieved sides of the teeth do not coincide with the imaginary surfaces constituting the effective sides of the thread. Furthermore, so far as I am aware, no attention whatever has been given to the fact that the relieved sides of the teeth must be of uniform lead at all diameters of the hob in order to retain the characteristic form of the cutting edges after resharpening.

The present invention is predicated upon the conception that a hob for generating involute gears must be essentially an involute helical gear, and that, as such, the effective sides of the thread, as distinguished from the actual relieved sides of a tooth, must be of involute form. Properly considered, the form of the effective side of a hob thread is defined by the cutting edges of successive teeth, which, in turn, are defined by the intersections of the relieved sides and cutting faces of the respective teeth. Thus, for any hob having a particular form of gash, and consequently a particular form of cutting face, the form of the cutting edges and consequently the form of the effective side of the thread is dependent upon the form of the relieved sides, although the form of the effective side of the thread is not identical with that of the relieved side of a tooth.

It is the general aim of the present invention to so shape the relieved sides of the teeth of a hob that the resulting cutting edges of successive teeth will define imaginary helicoidal surfaces of involute form constituting the effective sides of the hob thread.

Another object is the provision of a hob having these characteristics and in which the sides of the teeth are so formed that the cutting edges, and consequently the effective sides of the threads, will retain their characteristic form after resharpening.

For purpose of explanation, I shall select a hob in which the cutting sides of the gashes or flutes are generated by a radius of the hob and shall describe one method by which the sides of the teeth of such a hob may be formed to obtain the desired characteristics.

Other objects and advantages will hereinafter appear.

Figure 1:
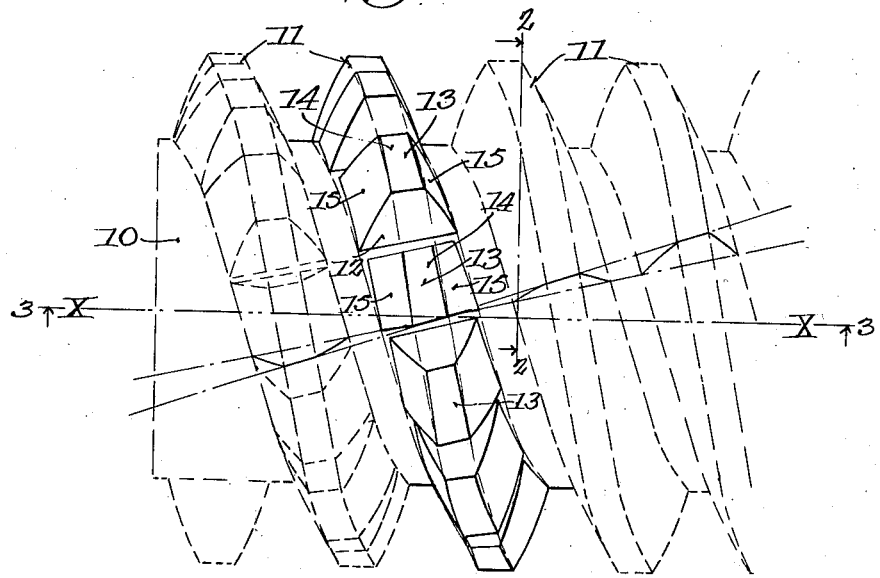
Figure 1 is a plan view diagrammatically illustrating a partially completed hob produced in accordance with the teachings of the present invention.

The hob selected for illustration comprises a cylindrical base 10 having a double thread 11 extending thereabout. These threads are interrupted in the usual manner by spiral flutes or gashes 12 to form the bodies 13 of the respective teeth. The top faces 14 of the teeth are relieved in the usual manner, the side faces 15 being axially relieved by the method fully described in my copending application, Serial No. 547,031, filed March 27, 1922. By the method therein disclosed, the side faces of the teeth constitute helicoidal surfaces of uniform lead at all diameters of the hob.

As above pointed out, the hob is considered as an involute helical gear and the teeth to be generated thereby are considered as the teeth of a conjugate gear. Upon this hypothesis the sides of a hob thread, which corresponds to the face of the tooth of a helical gear, must be of such form that an involute of a circle is obtained at its intersection with a plane of rotation of the hob. The diameter of the base circle for this involute, as well as the pitch circle, pressure angle, lead and other dimensions of the hob, can be determined by the usual principles applicable to spiral gears.

Figure 2:
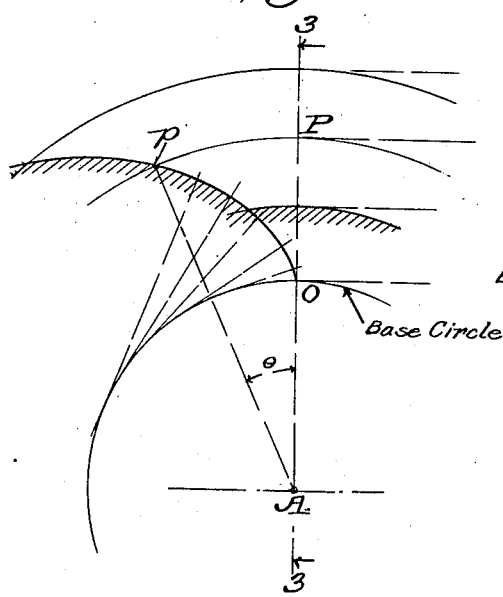
Figure 2 is a fragmentary sectional view, on a somewhat larger scale, taken substantially along the line 2—2 of Figure 1.

In the drawings, the line X—X indicates the axis of the hob; the line 2—2 a plane through the hob normal to the axis and referred to as a plane of rotation; the point A, the intersection of the axis of the hob with the plane of rotation; the point O, the origin of the involute curve, and the line 3—3, an axial plane of the hob passing through point O. Thus, in Figure 2, the intersection of the side of a thread with the plane of rotation is represented by the involute curve $Op$, derived from the base circle whose radius is AO. This curve may obviously be expressed in polar coordinates by the following characteristic polar equation:

$$\theta = \tan \operatorname{arc} \cos \frac{r}{s} - \operatorname{arc} \cos \frac{r}{s}, \quad (1)$$

in which $r$ is the radius AO of the base circle; $s$ is the radius vector or the distance of any point $p$ from the center A; and $\theta$ is the angle $OAp$ in radians between the radius vector and the polar axis AO.

Figures 3, 4:
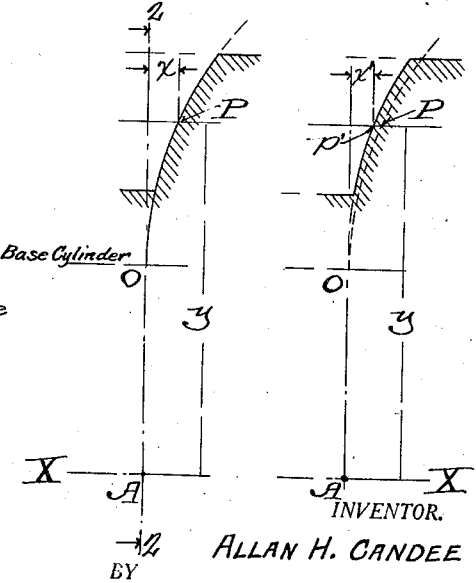
Figure 3 is a fragmentary sectional view taken substantially on the line 3—3 of Figures 1 and 2.
Figure 4 is a view similar to that of Figure 3 showing the contour of a side of a relieved tooth.

The curve OP of Figure 3 represents the intersection of the same side of the thread with an axial plane of the hob. This curve may be expressed in rectangular coordinates with reference to the axis of the hob and a given diameter of the hob as base lines. For this purpose, the line X—X will be considered as the X-axis and the line AO of the Y-axis.

Let point P (Fig. 3) represent any point on the curve OP whose known distance from the hob axis is represented by the distance $y$. To determine its distance $x$ from the line AO select a point $p$ on the curve $Op$ whose distance $Ap$ from the hob axis is equal to $y$.

By construction, both points P and $p$ lie in the side of the thread and both are the same distance from the hob axis. Since the lead of the side of the thread is uniform at all diameters, it is clear that the distance $x$ of the point P from the selected plane of rotation, is proportional to the angle $\theta$ between the point $p$ and the selected plane of the hob.

The exact relation is expressed by the following formula:

$$x = \frac{L}{2\pi} \theta, \quad (2)$$

in which L is the lead of the hob thread. Substituting in equation (2) the value of $\theta$ as expressed in equation (1) and also substituting for $s$ its equivalent $y$, we have $$x = \frac{L}{2\pi}\left(\tan \arccos \frac{r}{y} - \arccos \frac{r}{y}\right), \quad (3)$$

which constitutes the equation in rectangular coordinates of the curve OP. It is obvious that by giving $y$ several values in this equation and solving for $x$ in each instance the rectangular coordinates of several points of the curve OP may be determined and the curve plotted.

It now remains to determine a method by which the actual sides of the hob teeth may be given such form that the resulting cutting edges of successive teeth will line in an imaginary surface exactly conforming to the shape of the effective side of the thread, as defined by these two curves.

Since, as heretofore pointed out, the relieving lathe is most commonly used for forming the sides of the teeth, I shall describe a method based upon the use of such a machine, although the sides of the teeth may be formed by other means. To produce a hob having the desired characteristics the lathe tool is intermittently shifted in a direction substantially parallel to the hob axis in the manner described in my copending application above identified, so that the sides of the teeth thus relieved constitute helicoidal surfaces of uniform lead at all diameters of the hob. The tool is ordinarily clamped in the lathe in such position that its cutting edge lies in an axial plane of the hob.

In the case of straight fluted hobs in which the cutting face of each of the hob teeth lies in an axial plane of the hob, it is obvious that the side cutting edges of the teeth are represented by the curve OP and that under these conditions the curve OP also represents the correct form of the cutting edge of the lathe tool.

In the case of spirally fluted hobs, however, the cutting edges of the hob teeth do not lie in an axial plane of the hob and do not at any time during the relieving process coincide with the edge of the relieving tool, so that a tool edge of somewhat modified form is required in the production of hobs of this type. This matter is fully treated in my copending application, Serial No. 544,424, filed March 17, 1922, in which a formula is given by which the required correction in the angular setting of the edge of the lathe tool may be ascertained. This formula is applicable to hobs having straight sided threads. A formula of somewhat modified form is necessary in the case of curve sided threads, by which the correct modified form of tool cutting edge may be ascertained. This modified formula is as follows:

$$x' = x\frac{G+L_1}{G+L} \quad (4)$$

in which G is the lead of the gash helix; L is the lead of the thread; $L_1$ is the lead of the actual relieved side of the hob tooth; $x$ is the $x$-coordinate of any given point P on the curve OP; and $x'$ is the $x$-coordinate of the point $p'$ on the modified curve whose $y$-coordinate is the same as that of P.

It is clear that by the use of this formula in connection with formula (3) the rectangular coordinates of the several points on curve $Op'$, may be computed and the curve plotted. This curve, as shown in Figure 4, represents the intersection of an axial plane of the hob with the actual side of a relieved tooth and consequently represents the correct form for the edge of the tool necessary to produce a hob having the desired characteristics.

The formula last given is applicable to spirally fluted hobs in which the cutting faces of the teeth are helicoidal surfaces generated by a radius of the hob. In the case of hobs having hooked teeth, this formula will have to be somewhat modified.

I claim:

1. A spirally gashed hob for generating involute gears having one or more helical series of cutting teeth so relieved that the sides of the imaginary thread defined by the cutting faces of successive teeth are of involute form.

2. A hob for generating involute gears having one or more helical series of cutting teeth so relieved that the resultant cutting edges of the successive teeth of a series define an imaginary thread having sides so curved that the intersection of each with a plane normal to the axis of the hob constitutes an involute curve.

3. A hob for generating involute gears comprising one or more helical series of cutting teeth having relieved sides constituting helicoidal surfaces of uniform lead at all diameters of the hob and of such form that the resultant cutting edges of successive teeth define imaginary helicoidal surfaces of involute form.

4. A hob for generating involute gears comprising one or more helical series of cutting teeth having relieved sides constituting helicoidal surfaces of uniform lead at all diameters of the hob and of such form that the resultant side cutting edges of successive teeth lie in imaginary helicoidal surfaces whose intersections with a plane normal to the axis of the hob constitute involutes of a circle.

5. A hob for generating involute gears comprising one or more helical series of cutting teeth having relieved sides so shaped that the intersection of each with an axial plane of the hob constitutes a curve whose coordinates bear a direct mathematical relation to the coordinates of the involute of a circle.

In witness whereof, I hereunto subscribe my name this 7th day of April, 1922.

ALLAN H. CANDEE.